United States Patent
Bean et al.

(10) Patent No.: US 10,146,953 B1
(45) Date of Patent: Dec. 4, 2018

(54) SYSTEM AND METHOD FOR PHYSICAL DATA PACKETS ISOLATION FOR DIFFERENT TENANTS IN A MULTI-TENANT PROTECTION STORAGE ENVIRONMENT

(71) Applicant: EMC IP Holding Company LLC, Hopkinton, MA (US)

(72) Inventors: Thomas Alan Bean, San Jose, CA (US); Subhasish Chakraborty, Santa Clara, CA (US); Terry Gene Hahn, Los Altos, CA (US); David Alexander Darling, Palo Alto, CA (US); Hongyu Zhang, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/650,545

(22) Filed: Jul. 14, 2017

(51) Int. Cl.
```
G06F 21/62      (2013.01)
H04L 29/06      (2006.01)
G06F 17/30      (2006.01)
G06F 9/06       (2006.01)
```

(52) U.S. Cl.
CPC .......... *G06F 21/6218* (2013.01); *G06F 17/30* (2013.01); *H04L 63/08* (2013.01); *H04L 63/105* (2013.01); *G06F 9/06* (2013.01); *G06F 2221/2145* (2013.01)

(58) Field of Classification Search
CPC ....... H04L 29/06; H04L 63/08; H04L 63/105; G06F 21/6218; G06F 17/30; G06F 2221/2145; G06F 9/06
See application file for complete search history.

(56) References Cited

U.S. PATENT DOCUMENTS

| | | | |
|---|---|---|---|
| 8,612,969 B2 | 12/2013 | Nakano et al. | |
| 8,635,184 B2 | 1/2014 | Hsu et al. | |
| 2010/0241722 A1* | 9/2010 | Seminaro | H04L 67/025 709/207 |
| 2013/0346645 A1* | 12/2013 | Mayhew | G06F 15/167 710/52 |
| 2014/0137215 A1* | 5/2014 | Hummel | G06F 13/4022 726/5 |
| 2017/0064749 A1* | 3/2017 | Jain | H04L 61/256 |

FOREIGN PATENT DOCUMENTS

WO     2008/008183 A2     1/2008

\* cited by examiner

*Primary Examiner* — Ajay Ojha
(74) *Attorney, Agent, or Firm* — Chamberlain, Hrdlicka, White, Williams & Aughtry

(57) ABSTRACT

A data storage device includes egress ports, a logical data storage, and a packet processor. The local data storage includes resources allocated to multiple tenants. The packet processor obtains packets that include data stored in the resources of the logical data storage. The obtained packets are addressed to a packet destination. The packet processor selects an egress port of the egress ports based on mappings between the data and the multiple tenants. The packet processor sends the packets via the selected egress port.

15 Claims, 13 Drawing Sheets

SYSTEM AND METHOD FOR PHYSICAL DATA PACKETS ISOLATION FOR DIFFERENT TENANTS IN A MULTI-TENANT PROTECTION STORAGE ENVIRONMENT

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data storage device in accordance with one or more embodiments of the invention includes egress ports; a logical data storage including resources allocated to multiple tenants; and a packet processor. The packet processor obtains packets that include data stored in the resources of the logical data storage and that are addressed to a packet destination, select an egress port of the egress ports based on mappings between the data and the multiple tenants, and send the packets via the selected egress port.

In one aspect, a method of operating a data storage in accordance with one or more embodiments of the invention includes obtaining, by the data storage device, a data access request that requests a resource of a first tenant resources of a logical data storage of the data storage device; making, by the data storage device, a first determination that a routing policy applies to the data access request based on an owner of the resource; and sending, by the data storage device, the resource via a first egress port based on the routing policy.

In one aspect, a non-transitory computer readable medium in accordance with one or more embodiments of the invention includes computer readable program code, which when executed by a computer processor enables the computer processor to perform a method for operating a data storage device, the method includes obtaining, by the data storage device, a data access request that requests a resource of a first tenant resources of a logical data storage of the data storage device; making, by the data storage device, a first determination that a routing policy applies to the data access request based on an owner of the resource; and sending, by the data storage device, the resource via a first egress port based on the routing policy.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
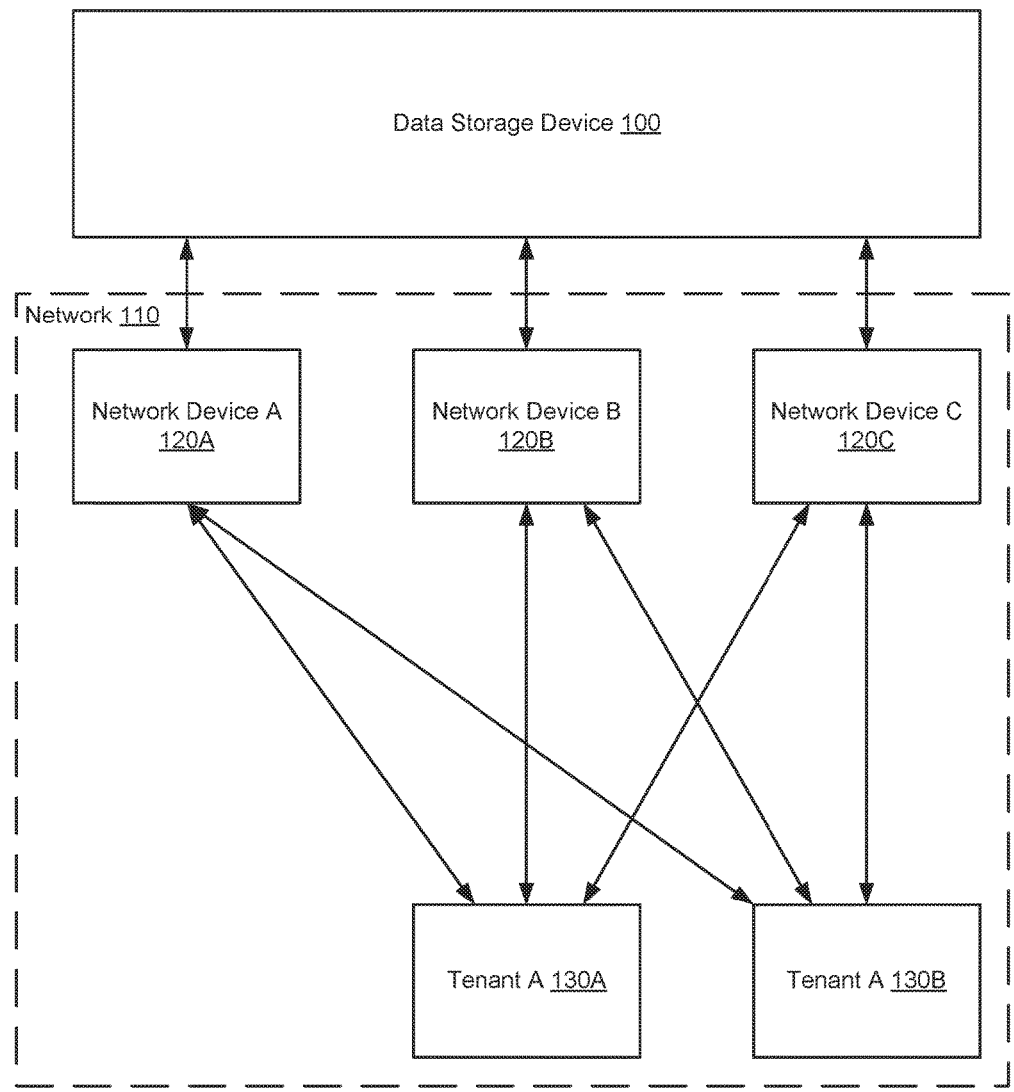
FIG. 1 shows a diagram of a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-10C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for managing a data storage device. More specifically, the methods, devices, and systems may provide functionality for controlling the flow of data stored in the data storage device across a network.

In one or more embodiments of the invention, a data storage device may be connected to a number of clients via a network including a number of computing devices disposed between the clients and the data storage device. Data stored on the data storage device by groupings of clients may include sensitive information. The groupings of clients may be referred to as tenants. One or more embodiments of the invention may enable a client to specify a data transmission path, or a portion thereof, that enables the tenant to reduce the chance of interception of the sensitive data by a third party.

FIG. 1A shows a diagram of an example of a system in accordance with one or more embodiments of the invention. The system includes a data storage device (100) that stores data from tenants (130A, 130B). The data storage device (100) and tenants (130A, 130B) are operably connected to each other via a network (110). The network (110) includes a number of network devices (120A, 120B, 120C) that forward packets between the tenants (130A, 130B) and the data storage device (100). Each of the aforementioned components is discussed below.

The tenants (130A, 130B) may include a number of clients (not shown). Each of the clients may be a computing device. The computing device may be, for example, a mobile phone, a tablet computer, a laptop computer, a desktop computer, or a server. The clients may be other types of computing devices without departing from the invention.

The clients may be programmed to store data in the data storage device. For example, the clients may store data in the data storage device (100) to backup their data, free up storage space by transferring data to the data storage device (100), or make data accessible to other clients by storing it in the data storage device (100).

The network (110) may include a number of communication links. The communication links may be any type of link that provide an operable connection such as, for example, a direct link, an indirect link, a wireless network, or a wired network. A direct link may be, for example, a port to port connection via a single wired cable. An indirect link may be, for example, a port to port link via multiple cables and an intermediary communication device. The intermediary communication device may be a hub, repeater, router, or any other type of communication device. A wireless network may be, for example, a network that includes one or more wireless links such as an IEEE 802.11 compliant link. A wired network may be, for example, a network such as the Internet. The clients and the data storage device (100) may be linked by any other type or combination of communication links without departing from the invention.

The network devices (120A, 120B, 120C) may be computing devices programmed to forward internet protocol (IP) traffic. In one or more embodiments of the invention, a network device may be associated with a tenant. The tenant may have programmed the network device to forward traffic in a predetermined manner so that packets received from the data storage device (100) are transmitted to the clients of the tenant through other network devices or links that the tenant has control over or are otherwise secure. Thus, once packets including data associated with a tenant are transmitted from the data storage device (100) to one of the network devices (120A, 120B, 120C) the tenant is able to ensure the security of the data by programming the packet forwarding behavior of the network device to forward the aforementioned packets using secure network resources.

The data storage device (100) may be a computing device. The computing devices may be, for example, a server and/or a cloud resource. The data storage device (100) may be other types of computing devices without departing from the invention.

The data storage device (100) may allow client of tenants to store and/or retrieve data stored on the data storage device (100). The data storage device (100) may forward packets that include data associated with a tenant to a predetermined network device operably connected to the data storage device (100). In one or more embodiments of the invention, the aforementioned network device may be a network gateway. Forwarding packets that include tenant data to predetermined network devices may enable the data storage device to reduce the chance of the tenant's data from being intercepted, stolen, or otherwise obtained without the express permission of the tenant while being provided to a client of the tenant by the data storage device.

In one or more embodiments of the invention, the data storage device may be a physical device that includes non-transitory computer readable storage, memory (e.g. Random Access Memory), and one or more processors. The processor may be hardware processors comprising circuitry. In one or more embodiments of the invention, the processors may be central processing units, risk processors, digital signal processors, packet processors, network processors, field programmable gate array, or any other type of digital processor. The memory may be hardware comprising circuitry. In one or more embodiments of the invention, the memory maybe random access memory. The non-transitory storage may include instructions, also referred to as computer readable program code, which when executed by the one or more processors enable the data storage device to perform the functions described in this application and shown in FIGS. 6-8. While illustrated in FIG. 1 as a single device, the data storage device (100) maybe implemented as a logical device that utilizes the resources of a number of different computing devices without departing from the invention.

In one or more embodiments of the invention, the data storage device may be implemented as a cloud service. For example, the data storage device may be implemented as computing code stored on a non-transitory medium that when executed by a cloud computing system causes the cloud computing system to perform the functions described in this application and shown in FIGS. 6-8.

Figure 2:
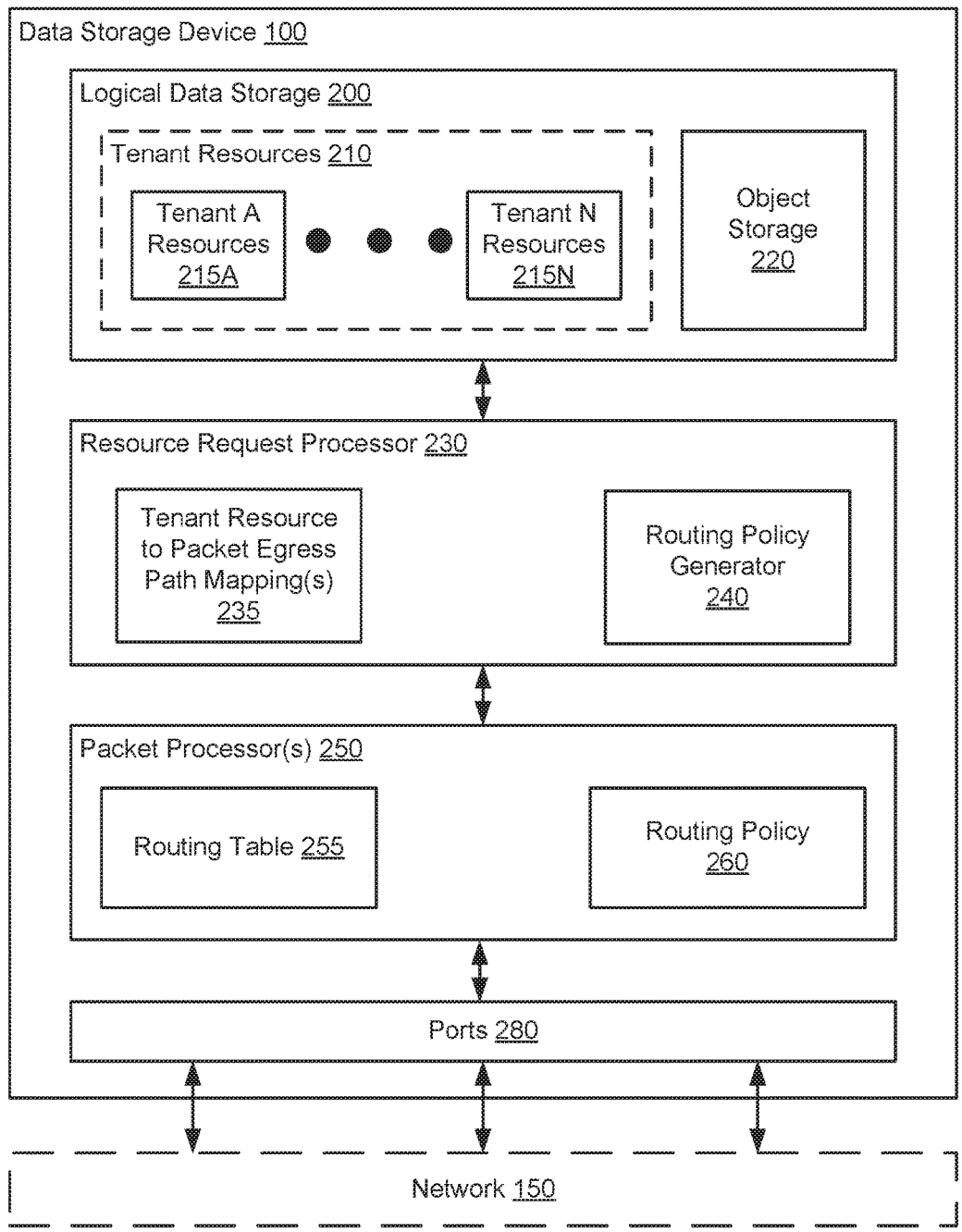
FIG. 2 shows a diagram of a data storage device in accordance with one or more embodiments of the invention.

FIG. 2 shows a diagram of an example of a data storage device in accordance with one or more embodiments of the invention. The data storage device includes a logical data storage (200), a resource request processor (230), packet processor(s) (250), and ports (280). Each component of the data storage device is discussed below.

The logical data storage (200) may store data from clients of one or more tenants. In one or more embodiments of the invention, the logical data storage comprising any number of physical and/or cloud resources linked to form a single logical storage. The physical resources may be, for example, hard disk drives, solid state drives, or any other type of persistent storage. The cloud resources may be a second logical storage that includes any number of physical storage devices operable linked and/or unified to form a logical storage. The second logical storage may include redundancy or other data integrity features that ensure that failure of any of the physical storage elements does not cause data stored in the logical storage to be lost. The physical resources of the second logical storage of the cloud resources may be physically separated across a number of computing devices other than the data storage device that are each operably connected to the data storage device.

The logical data storage (200) may include tenant resources (210) and an object storage (220). The tenant resources (210) may include one or more data structures that specify data storage in the object storage (220) that is associated with each tenant.

For example, a tenant A resources (215A) may include a number of mappings between filenames, or other identification information, and a key of the object storage. The key may be information that enables the data stored in the object storage to be retrieved from the object storage. Thus, when a client requests access to a particular file that had been previously stored in the object storage (220) by a client of a tenant, the filename provided by the client may be used to obtain an associated key from the tenant A resources (215A). In one or more embodiments of the invention, the key may be a universally unique identifier (UUID) associated with a portion of the data stored in the object storage (220).

The object storage (220) maybe a deduplicated storage. As used herein, a deduplicated storage refers to a storage that attempts to reduce the required amount of storage space to store data by not storing multiple copies of the same files or bit patterns. Rather, when a new file or bit pattern is sent to the object storage for storage, the storage may compare all or a portion of the new file or bit pattern to files or bit patterns already stored in the object storage. If the new file or bit pattern, or a portion thereof, matches a file or bit pattern, or a portion thereof, already stored in the object storage, the new file or bit pattern, or portion thereof, is not stored in the object storage and the already stored file or bit pattern, or portion thereof, is associated with the filename included in the storage request for later retrieval.

In one or more embodiments of the invention, a file or bit pattern stored in the object storage (220) may be associated with one tenant or multiple tenants. For example, if a single tenant requests that a unique file be stored in the object storage, the object storage will store the unique file and only associate the stored unique file with resources of the single tenant. However, if a second tenant requests that the unique file be stored in the object storage after the unique file is already stored in the object storage, the object storage will not store a second copy of the unique file in the object storage and associate the second copy with the second tenant. Rather, the object storage (220) will only associate the stored unique file with the second tenant by adding another mapping to a tenant resources associated with the second tenant.

Thus, if a first tenant and a second tenant have requested that a unique file be stored in the object storage, each of the tenant resources (210) associated with each tenant will include mappings between a filename specified by each tenant and the UUID of the object storage (229) associated with the data containing the stored file. Thus, the data of the file may be retrieved from the object storage (220) using either filename (or other identifier) given to the file by either tenant and the corresponding tenant resources that map the filename to the UUID of the object storage (220).

The resource request processor (230) may process data access requests from clients of tenants. The resource request processor (230) may include tenant resource to packet egress path mapping(s) (235) and a routing policy generator (240).

The tenant resource to packet egress path mapping(s) (235) may be a data structure that specifies egress paths for any packets containing data associated with a tenant. For additional details regarding the tenant resource to packet egress path mapping(s) (235), See FIG. 3.

The routing policy generator (240) may program the routing policy (260) of the packet processor(s) (250), discussed in greater detail below. The routing policy generator selects one or more egress ports for each tenant based on the tenant resource to packet egress path mapping(s) (235).

More specifically, the routing policy generator (240) identifies which port of the ports (280) is directly connected to a network device specified by an egress path associated with a tenant. The routing policy generator (240) then programs the routing policy for the tenant based on the identified port.

The packet processor(s) (250) may generate and/or send packets to network devices directly connected to the data storage device (100) via the ports (280). The packet processor(s) (250) may include a routing table (255) and a routing policy (260) that controls the packet addressing and sending behavior of the packet processor(s). The packet processor(s) may be programmed to perform the method shown in FIGS. 6-8.

The routing table (255) maybe a data structure that maps packet destinations, e.g., IP addresses, to ports (280) of the network device. In one or more embodiments of the invention, the routing table (255) includes mappings that minimize the computation/bandwidth/access cost of sending packets from the data storage device (100) to the clients of the tenants connected to the data storage device (100) via the network (150). For additional details regarding the routing table (255), See FIG. 4.

While not illustrated, the routing table (255) may include different types or other mappings without departing from the invention. For example, the routing table (255) may include mappings that specify egress ports based on a tenant that is associated with data included in a packet. In other words, when a packet is generated it may include data associated with a tenant. The routing table may specify one or more egress ports associated with each tenant and thereby may enable an egress port to be selected based on the tenant associated with the data included in the packets.

The routing policy (260) may be a data structure that maps packet destinations to ports (280) of the network device. As discussed above, the routing policy (260) may be programmed by the routing policy generator (240) so that the packet egress path, i.e., the egress port, causes packets included tenant data to be transmitted via tenant selected network resources. For additional details regarding the routing policy, See FIG. 5.

In one or more embodiments of the invention, a routing policy (260) may not apply to all of the tenants that utilize the data storage system. In other words, some tenants that utilize the data storage device may not restrict an egress path of packets including tenant data while other tenants may restrict an egress path of packets including the other tenants' data.

Figure 3:
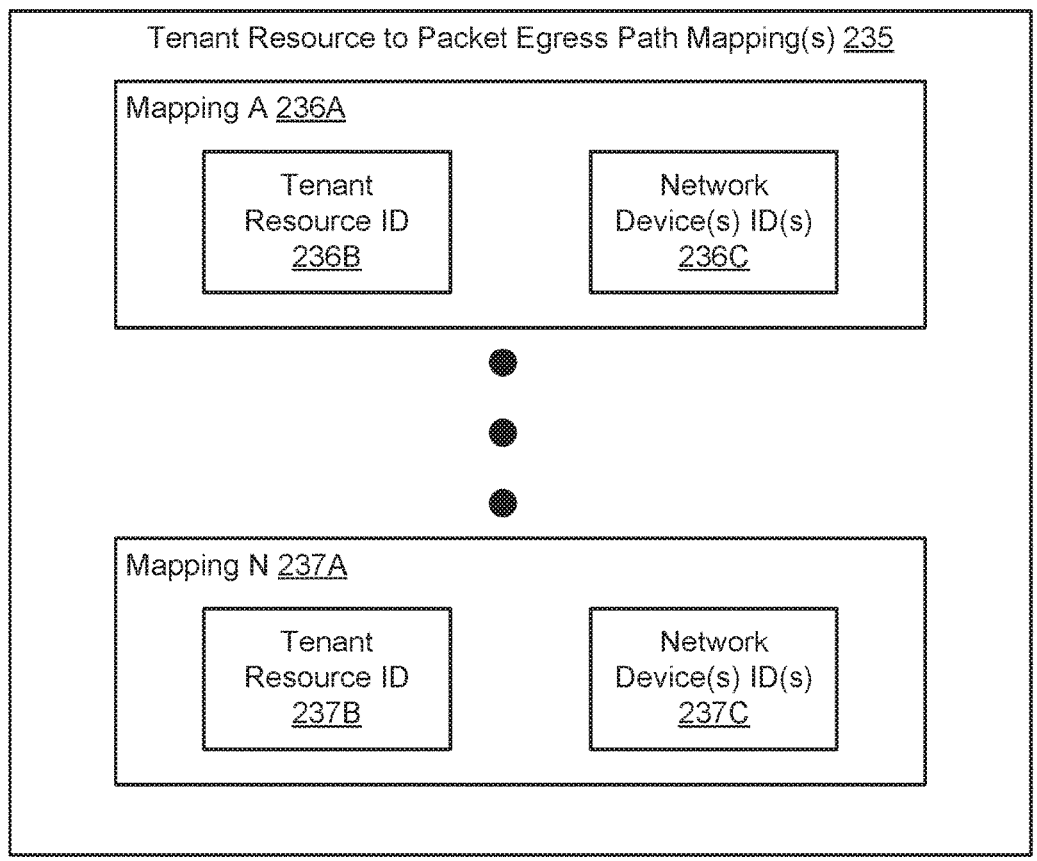
FIG. 3 shows a diagram of tenant resource to packet egress path mappings in accordance with one or more embodiments of the invention.
Figure 4:
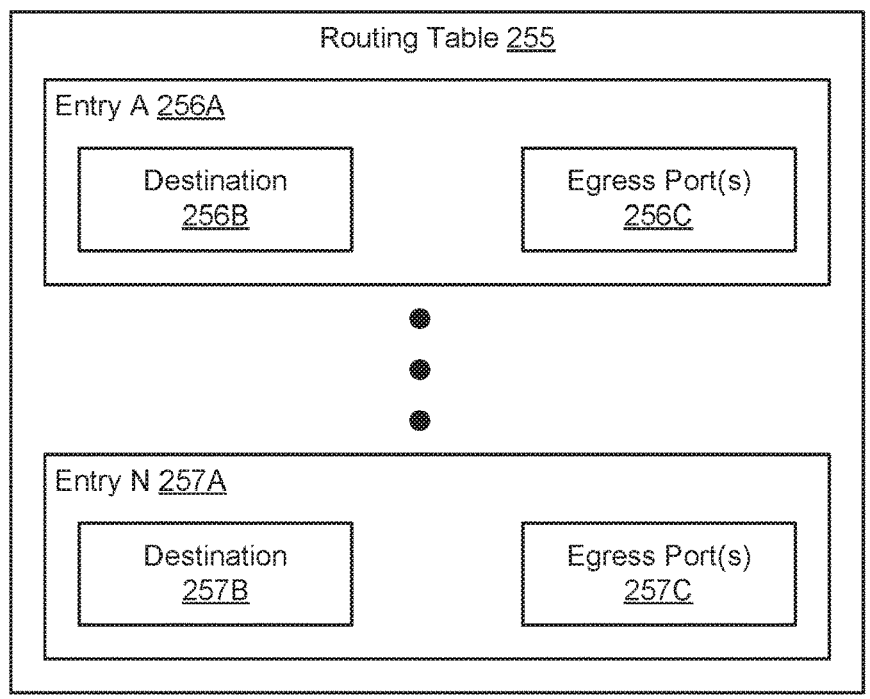
FIG. 4 shows a diagram of a routing table in accordance with one or more embodiments of the invention.
Figure 5:
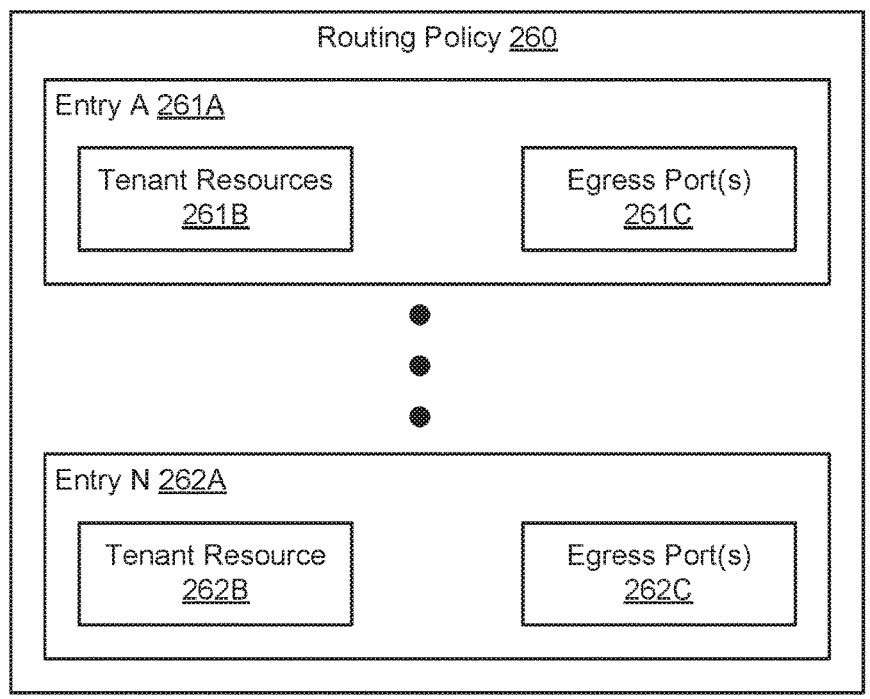
FIG. 5 shows a diagram of a routing policy in accordance with one or more embodiments of the invention.

FIGS. 3-5 show examples of data structures used by the data storage device. The data structures include mappings between tenant resource and egress paths, packet destinations and egress ports, and tenant resources and egress ports. Each of the aforementioned mappings may enable the data storage device to forward packet in a manner specified by a tenant so that packets including tenant data may be transmitted via a secure path over the network to a client of the tenant that requested the data. The data storage device may not include all of the data structures, may include additional data structures, or may structure the data shown in FIGS. 3-5 differently without departing from the invention.

FIG. 3 shows a diagram of example tenant resource to packet egress path mapping(s) (235) in accordance with one or more embodiments of the invention. The tenant resource to packet egress path mapping(s) (235) may include a number of mappings (236A, 237A) that each specify an egress path for a corresponding tenant resource.

For example, mapping A (236A) includes a tenant resource ID (236B) and network device ID(s) (236C) associated with the tenant resource identified by the tenant resource ID (236B). The tenant resource ID (236B) may be a filename, or other identification information, of tenant resources. The network device ID(s) (236C) may be a name, or other identification information, that identifies one or more network devices directly connected to the data storage device via a port of the data storage device.

The tenant resource to packet egress path mapping(s) (235) may include any number of mappings. The mappings may be specified at a granular level, e.g., on a per file basis, or at a macro level, e.g., on a tenant basis. In one or more embodiments of the invention, the aforementioned mappings include a single mapping that specifies an egress path to which all packets including data of a tenant are to be sent.

In other words, all packets that include resources of a particular tenant may be sent a long a predetermined egress path.

FIG. 4 shows a diagram of an example routing table (255) in accordance with one or more embodiments of the invention. The routing table (255) may include a number of entries (256A, 257A) that each specify a mapping between a packet destination (256B, 257B) and one or more egress ports (256C, 257C). The egress ports may be ports of the data storage device or another network device connected to the data storage device and through which the data storage device may send and address packets.

For example, entry A (256A) includes a packet destination (256B) and egress ports (256C). The packet destination (256B) may be an identifier of a network device operably connected to the data storage device via the network (150, FIG. 2).

The routing table (255) may include any number of mappings. The mappings may be specified at a granular level, e.g., on an IP address basis, or at a macro level, e.g., a low specificity classless inter-domain routing (CIDR).

FIG. 5 shows a diagram of an example routing policy (260) in accordance with one or more embodiments of the invention. The routing policy (260) may include a number of entries (261A, 262A) that each specify a mapping between tenant resources (261B, 262B) and one or more egress ports (261C, 262C). The egress ports may be ports of the data storage device or another network device connected to the data storage device and through which the data storage device may send and address packets.

For example, entry A (261A) includes tenant resources (261B) and egress ports (261C). The tenant resources (261B) may one or more filenames or identification information of the tenant resources of a particular tenant.

Figure 6:
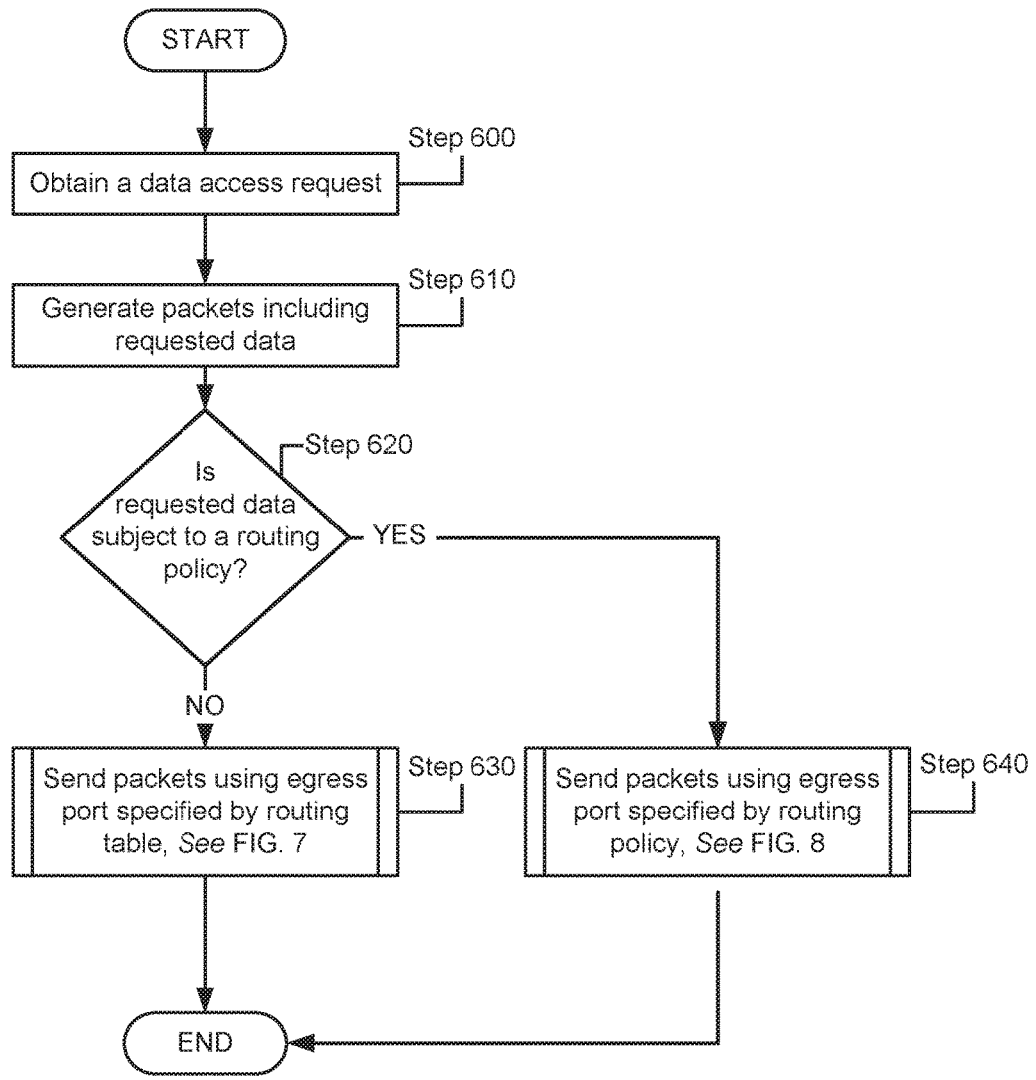
FIG. 6 shows a flowchart of a method of operating a data storage device in accordance with one or more embodiments of the invention.

FIG. 6 shows a flowchart according to one or more embodiments of the invention. The method depicted in FIG. 6 may be used to send data to a client of a tenant in accordance with one or more embodiments of the invention. The method shown in FIG. 6 may be performed by, for example, a data storage device (100, FIG. 1).

In Step 600, a data access request is obtained. The data access request may specify data stored in an object storage of the data storage device.

In Step 610, packets including the requested data are generated.

In Step 620, it is determined whether the requested data is subject to a routing policy. If the requested data is not subject to a routing policy, the method proceeds to Step 630. If the requested data is subject to a routing policy, the method proceeds to Step 640.

In Step 630, the packets are sent using an egress port specified by a routing table. Sending the packets using an egress port specified by the routing table may be performed using the method shown in FIG. 7.

In Step 640, the packets are sent using an egress port specified by a routing policy. Sending the packets using an egress port specified by the routing policy may be performed using the method shown in FIG. 8.

Figure 7:
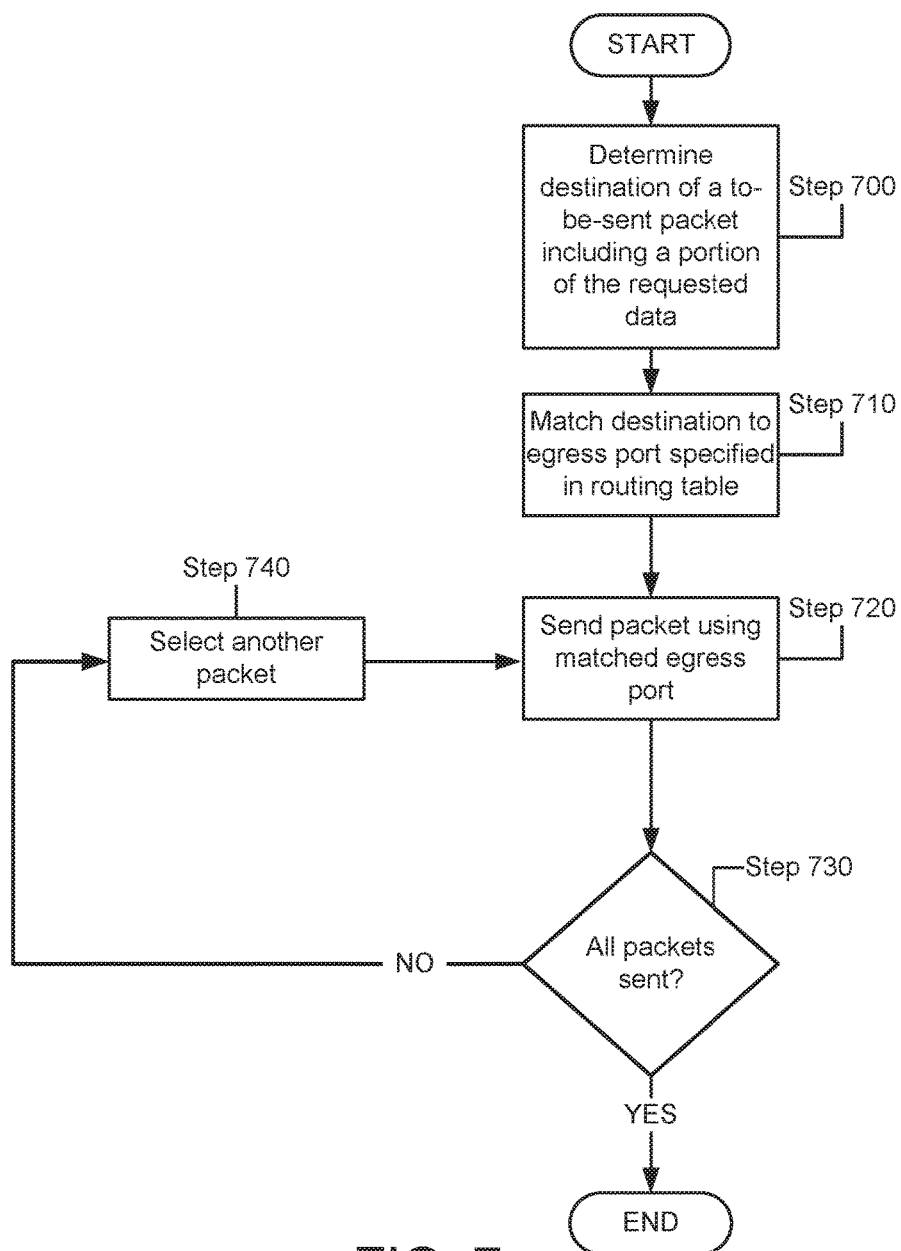
FIG. 7 shows a flowchart of a method of sending packets using a routing table in accordance with one or more embodiments of the invention.

FIG. 7 shows a flowchart according to one or more embodiments of the invention. The method depicted in FIG. 7 may be used to send packets via an egress port specified by a routing table in accordance with one or more embodiments of the invention. The method shown in FIG. 7 may be performed by, for example, a data storage device (100, FIG. 1).

In Step 700, a destination of a to-be-sent packet including a portion of the requested data is obtained. The destination may be obtained from the data access request. In one or more embodiments of the invention, the data access request specifies an IP address or other identification information that enables the data storage device to determine a destination of generated to-be-sent packets that include the requested data.

In Step 710, the destination is matched to an egress port specified in the routing table. The match may be determined by comparing the destination to each entry of the routing table until an entry including the destination is found. The entry may include a number of egress ports as shown, for example, in FIG. 4. One of the egress ports of the entry may be used as the matched egress port.

In one or more embodiments of the invention, one of the egress ports of the entry may be selected as the matched based on computational resources usage considerations. More specifically, one of the egress ports may be selected that reduces the computational/bandwidth resource usage of the network or data storage device when sending the to-be-sent packets. In one or more embodiments of the invention, a longest prefix match algorithm may be used to identify an egress port of the entry.

In Step 720, the to-be-sent packet is sent using the matched egress port.

In Step 720, it is determined whether all of the packets that include portions of the requested data have been sent. If all of the packets have been sent, the method may end. If all of the packets have not been sent, the method proceeds to Step 740.

In Step 740, another packet including a portion of the requested data that has not yet been sent is selected as the to-be-sent packet.

Figure 8:
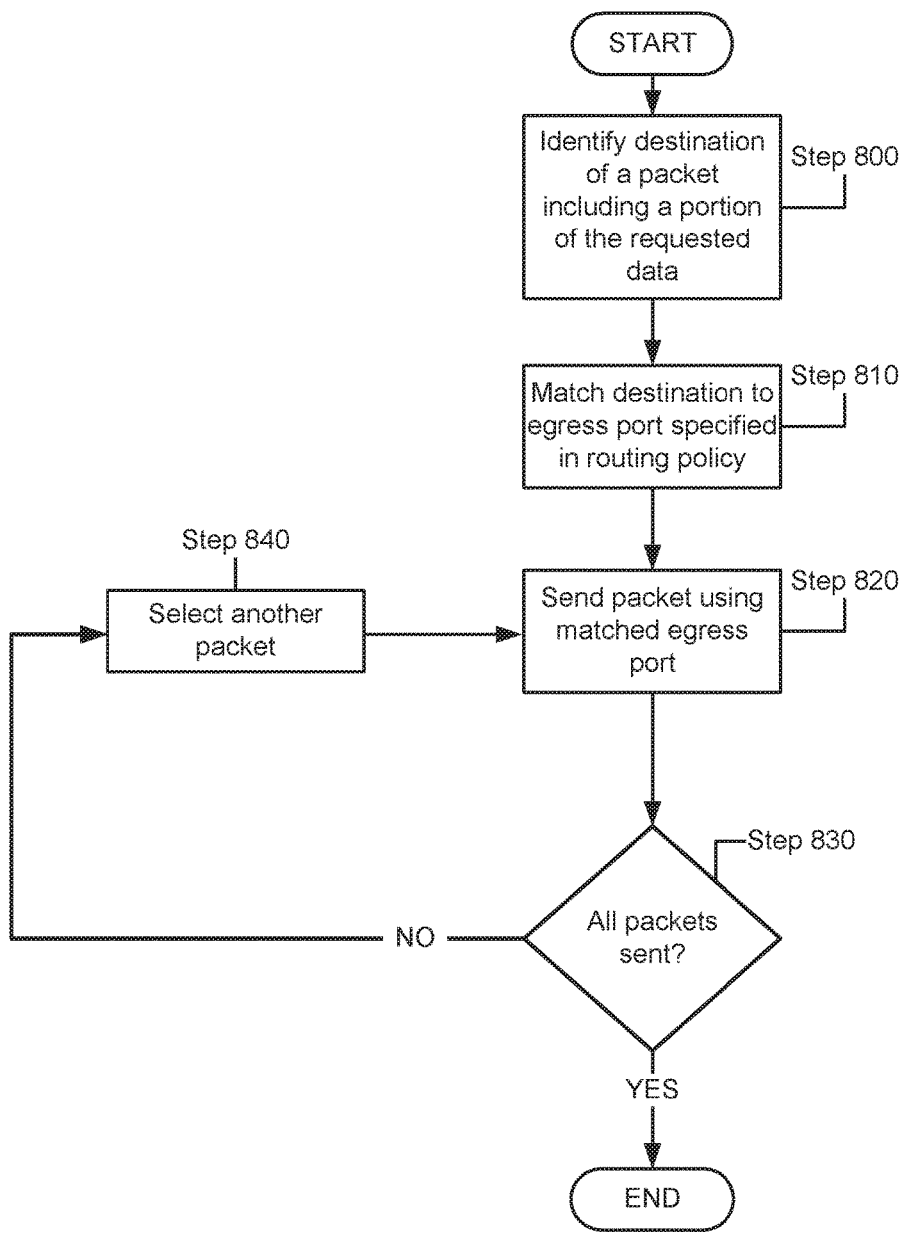
FIG. 8 shows a flowchart of a method of sending packets using a routing policy in accordance with one or more embodiments of the invention.

FIG. 8 shows a flowchart according to one or more embodiments of the invention. The method depicted in FIG. 8 may be used to send packets via an egress port specified by a routing policy in accordance with one or more embodiments of the invention. The method shown in FIG. 8 may be performed by, for example, a data storage device (100, FIG. 1).

In Step 800, a destination of a to-be-sent packet including a portion of the requested data is obtained. The destination may be obtained from the data access request. In one or more embodiments of the invention, the data access request specifies an IP address or other identification information that enables the data storage device to determine a destination of generated to-be-sent packets that include the requested data.

In Step 810, the destination is matched to an egress port specified in the routing policy. The match may be determined by comparing the destination to each entry of the routing policy until an entry including the destination is found. The entry may include a number of egress ports as shown, for example, in FIG. 4. One of the egress ports of the entry may be used as the matched egress port.

In one or more embodiments of the invention, one of the egress ports of the entry may be selected as the matched based on computational resources usage considerations. More specifically, one of the egress ports may be selected that reduces the computational/bandwidth resource usage of the network or data storage device when sending the to-be-sent packets. In one or more embodiments of the invention, a longest prefix match algorithm may be used to identify an egress port of the entry.

In Step 820, the to-be-sent packet is sent using the matched egress port.

In Step 820, it is determined whether all of the packets that include portions of the requested data have been sent. If all of the packets have been sent, the method may end. If all of the packets have not been sent, the method proceeds to Step 840.

In Step 840, another packet including a portion of the requested data that has not yet been sent is selected as the to-be-sent packet.

The following are explanatory examples of systems in accordance with embodiments of the invention. The aforementioned examples are for explanatory purposes and are non-limiting.

Example 1

Figure 9A:
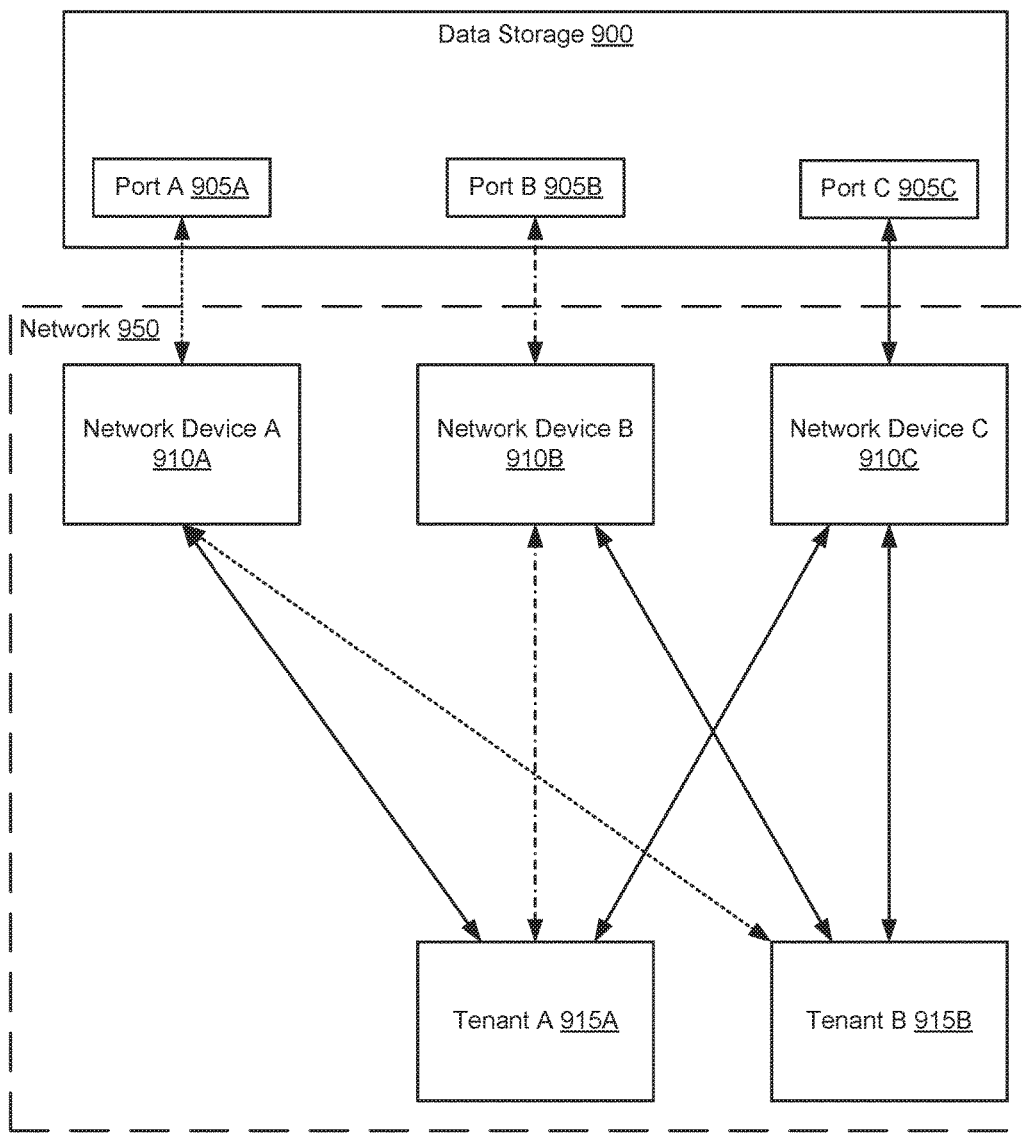
FIG. 9A shows an example of a first system.

FIG. 9A shows a diagram of a first example system. The first example system includes a data storage device (900) operably connected to a number of network devices (910A-910C) via a number of ports (905A-905C). Each of the network devices (910A-910C) are operably connected to Tenant A (915A) and Tenant B (915B), referred to as the tenants. While illustrated as being directly connected, the tenants may be indirectly connected to the network devices (910A-910C). Additionally, the length of each arrow between each network device and each tenant indicates a relative transmission cost of a communication link between the respective tenant and network device. The link between, for example, network device A (910A) and tenant B (915B) has the greatest transmission cost as indicated by its length being the longest. As used here, the transmission cost refers to a computational cost and/or network bandwidth cost of sending packets via a communication link. The network device B (910B) may be owned, e.g., controlled by, Tenant A (915A) and the network device A (910A) may be owned by Tenant B (915B).

Each of the tenants includes a number of clients. At least one client of each client has stored data in the object storage of the data storage device.

Figure 9B:
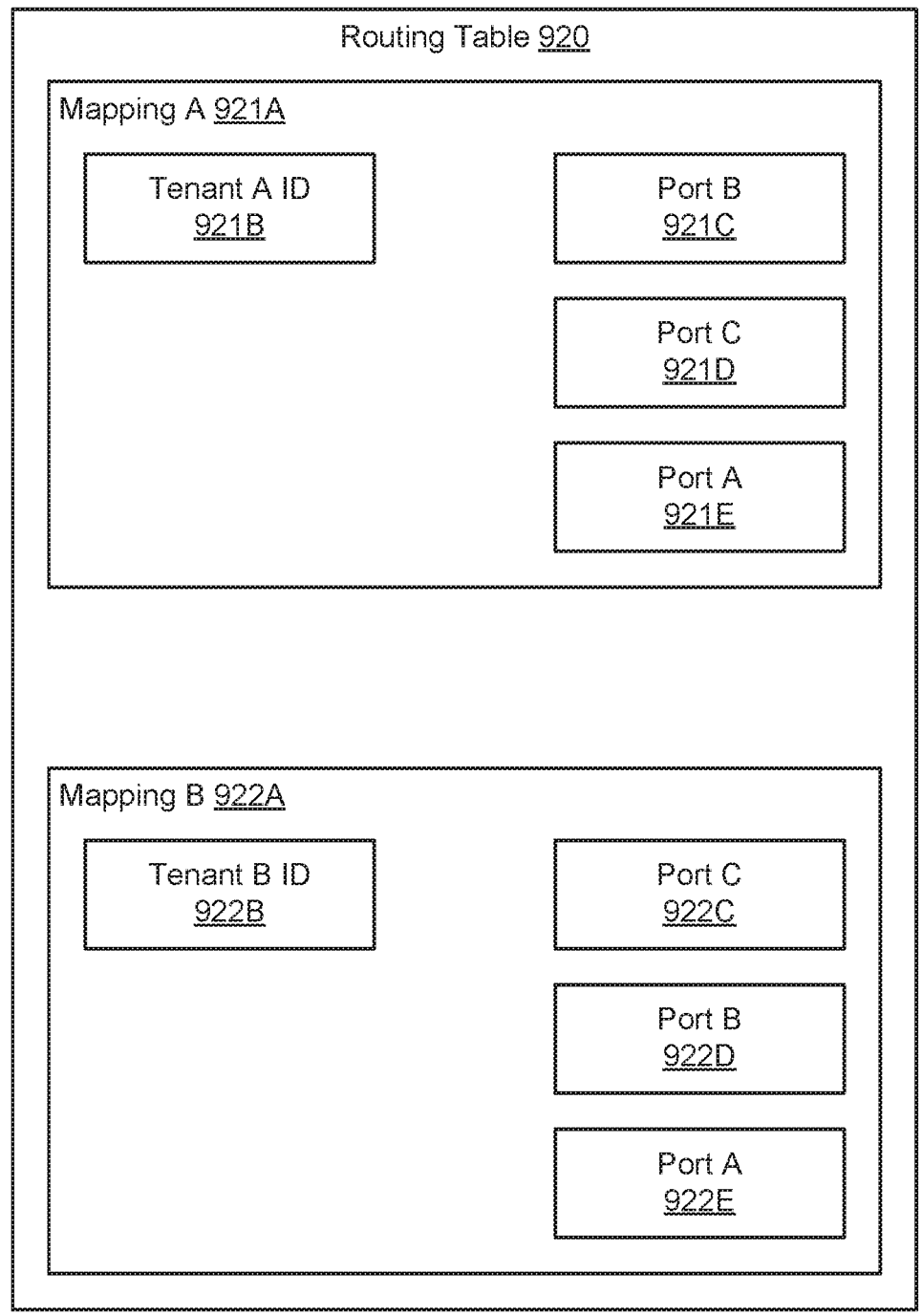
FIG. 9B shows a routing table of the first system.

FIG. 9B shows a routing table of the data storage device of FIG. 9A. The routing table includes two mappings (921A, 922A) between packet destinations and ports of the network device. As seen from the topology of the network of FIG. 9A, packets may reach either tenant when sent via any port. Thus, each mapping specifies that packets addressed to either tenant may be transmitted via any of the ports.

However, the ports of each mapping are ordered on an increasing transmission cost. For example, the ports of mapping A (921A) are ordered port B (921C), port C (921D), and port A (921E) which indicates that sending the packets addressed to tenant A via port B (921C) incurs the smallest transmission cost of the three ports.

Figure 9C:
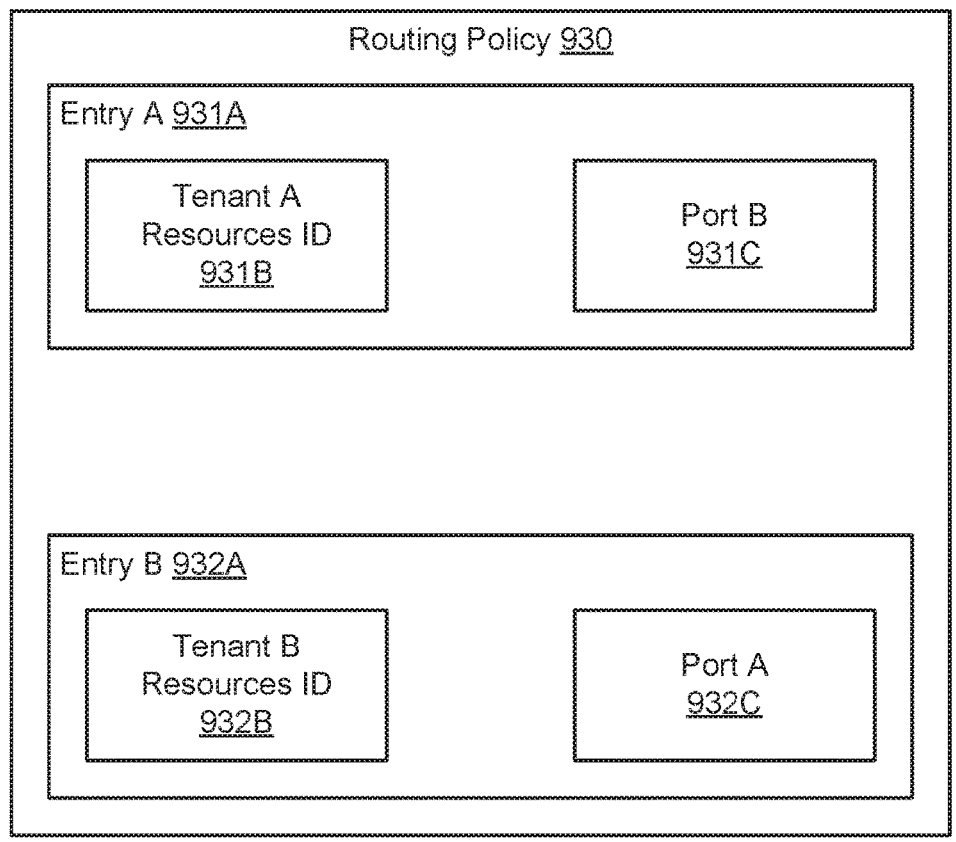
FIG. 9C shows a routing policy of the first system.

FIG. 9C shows a routing policy of the data storage device of FIG. 9A. The routing policy includes two entries (931A, 932A) that specify associations between data stored by each tenant in the data storage device and ports of the network device. For example, Entry A (931A) includes an identifier of a tenant A resources ID (931B) and thereby indicates that any packets including data of tenant A are to be sent to tenant A via port B (931C).

Returning to FIG. 9A, when the data storage device (900) receives data access requests that request tenant A data stored in the data storage device, the data storage device (900) looks to the routing policy shown in FIG. 9C to determine whether a routing policy applies. Based on entry A (931A), the data storage device identifies that a policy applies and sends all packets including the data specified in the request via port B (905B).

When the data storage device (900) receives data access requests that request tenant B data stored in the data storage device, the data storage device (900) looks to the routing policy to determine whether a routing policy applies. Based on entry B (932A), the data storage device identifies that a policy applies and sends all packets including the data specified in the request via port A (932C).

Sending the packets via port A (932C) to tenant B incurs a greater transmission cost than sending the packets via port C (905C) as indicated by the routing table shown in FIG. 9B. Thus, while the transmission cost may be greater, the security of the transmission of the requested data to a client of tenant B (915B) is improved because the data is transmitted via network device A (910A) which is controlled by Tenant B (915B).

Example 2

Figure 10A:
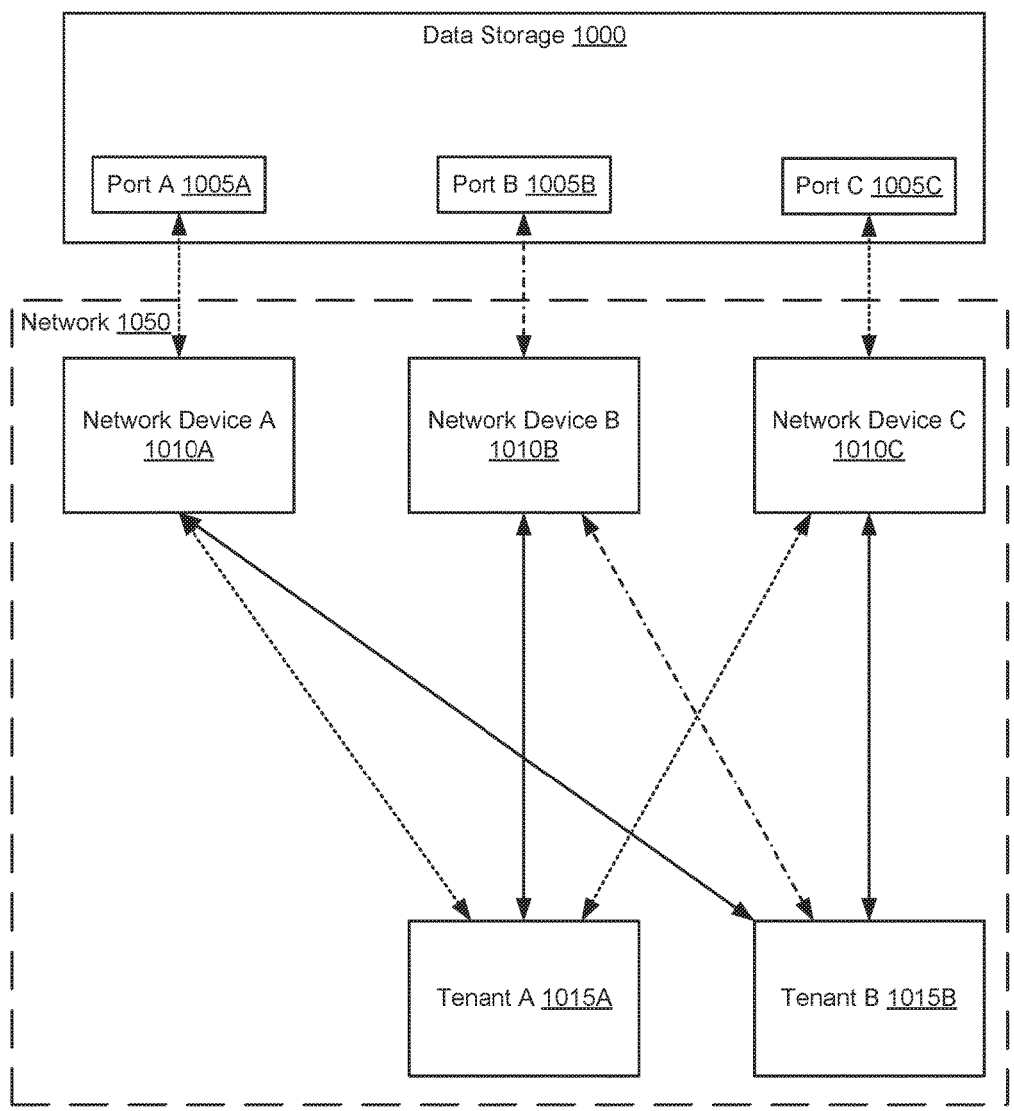
FIG. 10A shows an example of a second system.

FIG. 10A shows a diagram of a second example system which has a network topology that is the same as the first example. The second example system includes a data storage device (1000) operably connected to a number of network devices (1010A-1010C) via a number of ports (1005A-1005C). Each of the network devices (1010A-1010C) are operably connected to Tenant A (1015A) and Tenant B (1015B), referred to as the tenants. While illustrated as being directly connected, the tenants may be indirectly connected to the network devices (1010A-1010C). Similarly to FIG. 9A, the length of each arrow of FIG. 10A between each network device and each tenant indicates a relative transmission cost of a communication link between the respective tenant and network device. The network device B (1010B) may be owned, e.g., controlled by, Tenant A (1015A) and the network device A (1010A) may be owned by Tenant B (1015B).

Figure 10B:
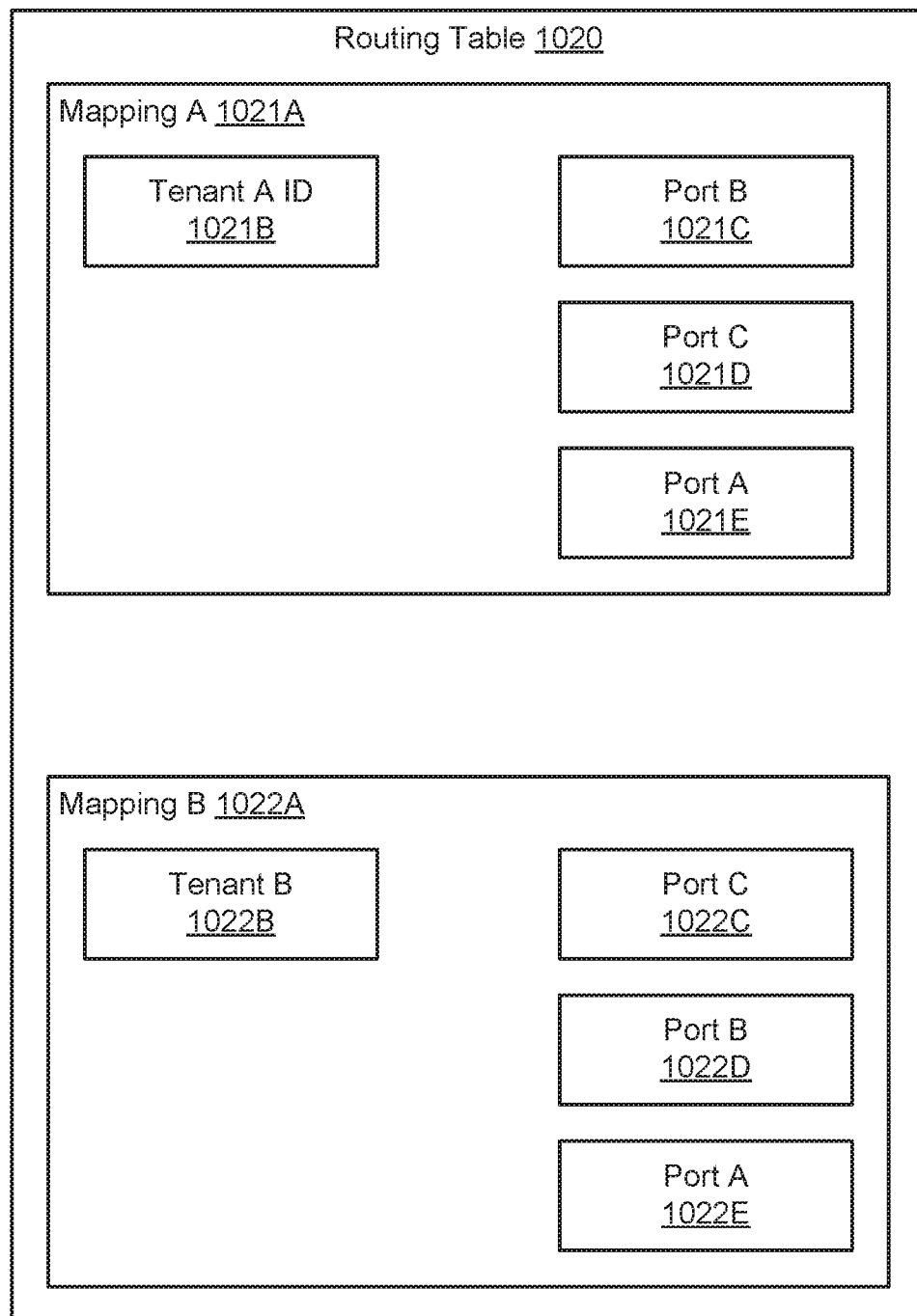
FIG. 10B shows a routing table of the second system.

FIG. 10B shows a routing table of the data storage device of FIG. 10A. The routing table is identical to the routing table of FIG. 9B. The routing table includes two mappings (1021A, 1022A) between packet destinations and ports of the network device. As seen from the topology of the network of FIG. 10A, packets may reach either tenant when sent via any port. Thus, each mapping specifies that packets addressed to either tenant may be transmitted via any of the ports.

However, the ports of each mapping are ordered on an increasing transmission cost. For example, the ports of mapping A (1021A) are ordered port B (1021C), port C (1021D), and port A (1021E) which indicates that sending the packets addressed to tenant A via port B (1021C) incurs the smallest transmission cost of the three ports.

Figure 10C:
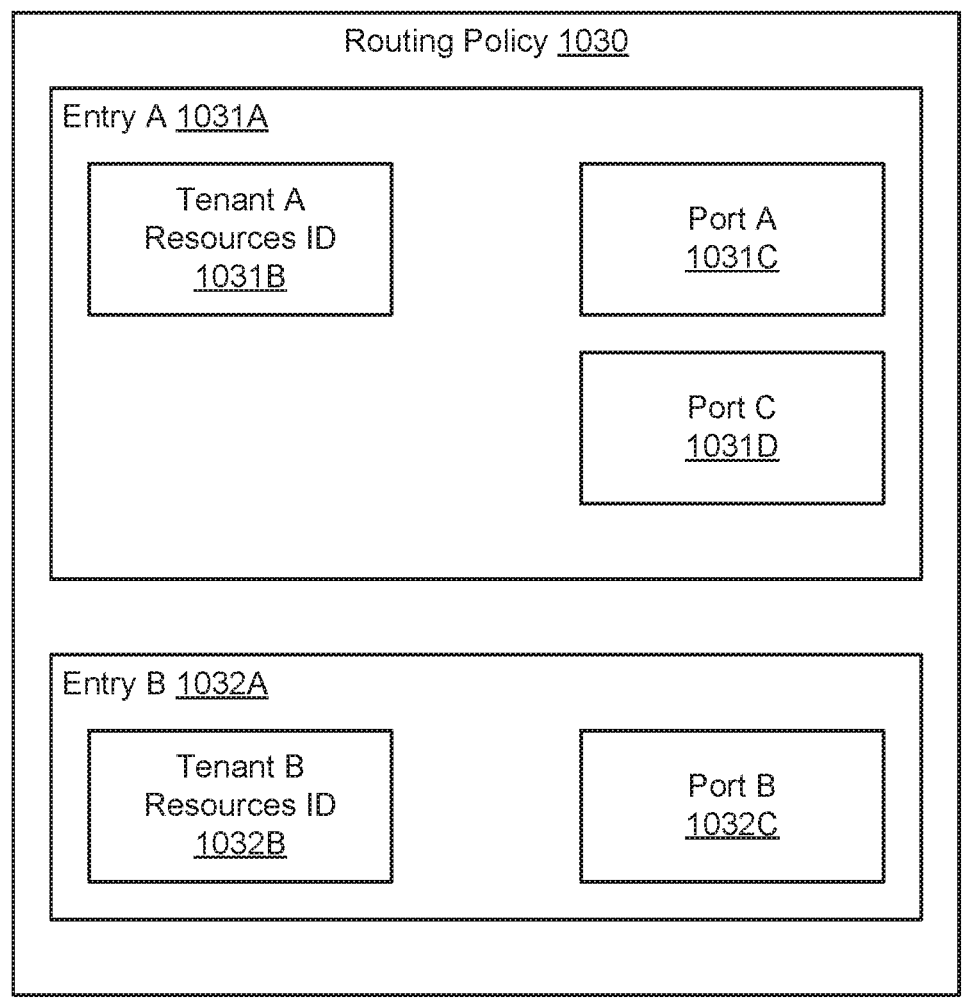
FIG. 10C shows a routing policy of the second system.

FIG. 10C shows a routing policy of the data storage device of FIG. 10A. The routing policy includes two entries (1031A, 1032A) that specify associations between data stored by each tenant in the data storage device and ports of the network device. For example, Entry A (1031A) includes an identifier of a tenant A resources ID (1031B) and thereby indicates that any packets including data of tenant A are to be sent to tenant A via port A (1031C) or port C (1031D). Entry B (1032A), for example, includes an identifier of tenant B resources ID (1032B) and thereby indicates that any packets including data of tenant B are to be sent to tenant B via port B (1032C).

Returning to FIG. 10A, when the data storage device (1000) receives data access requests that request tenant A data stored in the data storage device, the data storage device (1000) looks to the routing policy shown in FIG. 10C to determine whether a routing policy applies. Based on entry A (1031A), the data storage device identifies that a policy applies and sends all packets including the data specified in the request via port A (1005A) or port C (1005C).

When the data storage device (1000) receives data access requests that request tenant B data stored in the data storage device, the data storage device (1000) looks to the routing policy to determine whether a routing policy applies. Based on entry B (1032A), the data storage device identifies that a policy applies and sends all packets including the data specified in the request via port B (1005BC).

In one or more embodiments of the invention, each tenant that utilizes a data storage device specifies a routing policy that requires packets including data associated with the tenant be sent to a network device that is different than any other network device to which packets containing data associated with other tenants are sent. Prior to sending packets including data from a tenant, the data storage device verifies that each routing policy specifies that no packets from different tenants are to be sent to the same network device. In one or more embodiments of the invention, each time a routing policy is provided by a tenant, the data storage device may check to see whether the routing policy may result in packets of the tenant be sent to a network device to which packets of a second tenant are sent. Performing the aforementioned checks may prevent routing policies that would otherwise cause packets from a tenant being sent to a network device that receives packets from other tenants.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) improved data security during transmission from a data storage device to a client by sending the packets to a predetermined network device from the data storage device, ii) reduced cognitive burden on a user of a data storage system by automatically transmitting data through secure network connections without requiring a user to configure the transmission path, iii) physical separation of packets including tenant data when transmitted via a network to a client, and (iv) modification of the network topology from a conventional network that minimizes the computation/bandwidth cost of transmitting data from a data storage device to a client of a tenant to a network topology that causes packets to bet transmitted along transmission routes controlled/owned by an associated tenant.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage device, comprising:
   a plurality of egress ports;
   a logical data storage comprising resources allocated to multiple tenants; and
   a packet processor programmed to:
   obtain packets comprising data stored in the resources of the logical data storage and addressed to a packet destination,
   make a first determination that a tenant of the multiple tenants is an owner of the data using mappings between the data and the multiple tenants,
   make a second determination that no routing policy is associated with the owner of the data,
   in response to the second determination, select a first egress port based on a network device, specified by a routing table, that is operably connected to the data storage device, and
   send the packets via the first egress port.

2. The device of claim 1, wherein the mappings between the data and multiple tenants comprise an association between the data and a tenant that has access rights to the data.

3. The device of claim 1, wherein the routing table comprises associations between network locations and egress ports of the data storage device.

4. The device of claim 1, wherein the routing table specifies an association between the first egress port and the packet destination.

5. The device of claim 4, wherein the routing table specifies that the packets are to be sent via the first egress port.

6. A method of operating a data storage device, comprising:
   obtaining, by the data storage device, a data access request that requests data stored on a resource of a first tenant resources of a logical data storage of the data storage device;
   making, by the data storage device, a first determination that a routing policy applies to the data access request based on an owner of the resource; and
   sending, by the data storage device, packets comprising data stored in the resource via a first egress port based on the routing policy.

7. The method of claim 6, further comprising:
   obtaining, by the data storage device, a second data access request that requests data stored on a second resource of a second tenant resources of the logical data storage of the data storage device,
   making, by the data storage device, a second determination that no routing policy applies to the second data access request based on a second owner of the second resource of the second tenant resources, and
   sending, by the data storage device, second packets comprising data stored in the second resource via a second egress port based on a routing table.

8. The method of claim 7, wherein the routing table specifies that the packets comprising data stored on the first tenant resources are sent via the second egress port.

9. The method of claim 6, wherein the routing policy specifies that all packets comprising data stored on the first tenant resources are sent via the first egress port.

10. The method of claim 9, further comprising:
    obtaining, by the data storage device, a second data access request that requests data stored on a second resource of the first tenant resources of the logical data storage of the data storage device,
    making, by the data storage device, a second determination that the routing policy applies to the second data access request based on the owner of the second resource of the first tenant resources, and
    sending, by the data storage device, second packets comprising data stored in the second resource via the first egress port based the routing policy.

11. A non-transitory computer readable medium comprising computer readable program code, which when executed by a computer processor enables the computer processor to perform a method for operating a data storage device, the method comprising:

obtaining, by the data storage device, a data access request that requests data stored on a resource of a first tenant resources of a logical data storage of the data storage device;

making, by the data storage device, a first determination that a routing policy applies to the data access request based on an owner of the resource; and sending, by the data storage device, packets comprising data stored in the resource via a first egress port based on the routing policy.

12. The non-transitory computer readable medium of claim 11, wherein the method further comprises:

obtaining, by the data storage device, a second data access request that requests data stored on a second resource of a second tenant resources of the logical data storage of the data storage device, making, by the data storage device, a second determination that no routing policy applies to the second data access request based on a second owner of the second resource of the second tenant resources, and sending, by the data storage device, second packets comprising data stored in the second resource via a second egress port based on a routing table.

13. The non-transitory computer readable medium of claim 12, wherein the routing table specifies that the packets comprising data stored on the first tenant resources are sent via the second egress port.

14. The non-transitory computer readable medium of claim 11, wherein the routing policy specifies that all packets comprising data stored on the first tenant resources are sent via the first egress port.

15. The non-transitory computer readable medium of claim 14, wherein the method further comprises:

obtaining, by the data storage device, a second data access request that requests data stored on a second resource of the first tenant resources of the logical data storage of the data storage device, making, by the data storage device, a second determination that the routing policy applies to the second data access request based on the owner of the second resource of the first tenant resources, and sending, by the data storage device, second packets comprising data stored in the second resource via the first egress port based the routing policy.

* * * * *